United States Patent [19]

Yamano et al.

[11] 4,086,383
[45] Apr. 25, 1978

[54] SUPPORTS FOR PHOTOGRAPHIC PRINTING PAPER

[75] Inventors: Susumu Yamano; Jyunichi Yasuda, both of Tokyo, Japan

[73] Assignee: Oji Yuka Synthetic Paper Sales Co., Ltd., Tokyo, Japan

[21] Appl. No.: 798,540

[22] Filed: May 19, 1977

[30] Foreign Application Priority Data

May 20, 1976 Japan .................................. 51-57260

[51] Int. Cl.² ........................... B32B 3/00; B32B 5/02
[52] U.S. Cl. ................................ 428/174; 156/229;
428/212; 428/213; 428/328; 428/407; 428/483;
428/515; 428/516
[58] Field of Search ............... 428/174, 515, 403, 407,
428/323, 213, 483, 521, 212, 328; 156/229;
96/70, 33; 162/146, 157 R

[56] References Cited

U.S. PATENT DOCUMENTS 3,799,828  3/1974  Takashi et al. ...................... 156/229
3,841,943  10/1974  Takashi et al. ...................... 156/229

Primary Examiner—George F. Lesmes
Assistant Examiner—Paul J. Thibodeau
Attorney, Agent, or Firm—Sughrue, Rothwell, Mion, Zinn and Macpeak

[57] ABSTRACT

A support for a photographic printing paper comprising (a) a polyolefin synthetic resin layer containing a white inorganic filler, (b) an opaque layer of a synthetic paper or a synthetic resin film, (c) a synthetic resin layer having a greater stiffness than the polyolefin synthetic resin layer and (d) a synthetic paper or a synthetic resin film layer on which writing is possible, wherein the relative thickness of the polyolefin synthetic resin layer (a) is not more than about 20% of the total thickness of the support and the relative thickness of the synthetic resin layer (c) having greater stiffness than the polyolefin synthetic resin layer (a) is not less than about 15% of the total thickness of the support.

5 Claims, 2 Drawing Figures

SUPPORTS FOR PHOTOGRAPHIC PRINTING PAPER

BACKGROUND OF THE INVENTION

1. Field of the Invention

The present invention relates to supports for a photographic printing paper having suitable physical and photographic properties as supports for a photographic printing paper.

2. Description of the Prior Art

Natural paper hitherto widely used as a support for a photographic printing paper has excellent stiffness, shape retention, adhesion to a photographic layer (e.g., a photographic light-sensitive layer), etc.

The use of natural paper as a support, however, has the disadvantages in that expensive paper having a low impurity content must be used so that the photographic properties of the photographic printing paper as a final product are not deteriorated. This results in an increase in the cost of the final product and, moreover, the quality stability of the product is poor and the operation efficiency is low since a long peiord of time is needed in washing and drying due to the water adsorption property of paper, development and print processing solutions are deteriorated rapidly, and the dimensional stability with changes in humidity is poor.

On the other hand, supports of a synthetic paper, a synthetic resin film, etc., do not have the above disadvantages of a natural paper support, do not absorb water and enable rapid development and printing to be effected.

However, the supports of a synthetic paper, etc., have the following disadvantages; deterioration preventing agents and antistatic agents incorporated in the synthetic resin film of the synthetic paper or coating agents, etc., coated on the surface thereof so as to increase the printing properties permeate through the photographic layer, thus causing discoloration after a long period of time; the surface luster as a photographic printing paper is poor; the adhesion between the support and the photographic layer is poor and the photographic layer is easily peeled off; the shape retention is poor since a synthetic paper itself is not rigid; since a synthetic paper is less stiff in comparison with natural paper having the same thickness and is not subject to expansion and contraction due to changes in temperature, when a photographic layer coated on the surface of a synthetic paper support expands or contracts due to changes in temperature, the synthetic paper support is pulled by the photographic layer and thus the photographic printing paper is easily bent; since heat-rolling can not be applied, a support having a smooth surface must be used for obtaining a photographic layer having a smooth surface, but the surface of a synthetic paper is uneven, etc.

SUMMARY OF THE INVENTION

An object of the present invention is to provide a support for a photographic printing paper in which the disadvantages of synthetic papers or synthetic resin films are removed without losing the various advantages thereof and which is light in weight as a support for photographic printing paper and has excellent curling properties, stiffness or shape retention, surface smoothness, edge-staining properties, properties on the back surface enabling such to be easily written upon and other properties after coating of a photographic layer.

Thus the present invention provides a support for a photographic printing paper which is a laminate, in order, of (a) a polyolefin synthetic resin layer containing a white inorganic filler; (b) an opaque layer of a synthetic paper or a synthetic resin film; (c) a synthetic resin layer having a greater stiffness than the polyolefin synthetic resin layer (a), and (d) a synthetic paper or a synthetic resin film layer on which writing is possible; wherein the relative thickness of the polyolefin synthetic resin layer (a) is not more than about 20% of the total thickness of the support and the relative thickness of the synthetic resin layer (c) having a greater stiffness than the polyolefin synthetic resin layer (a) is not less than about 15 % of the total thickness of the support.

DETAILED DESCRIPTION OF THE INVENTION

The present invention is explained in detail by reference to the drawings attached.

Figure 1:
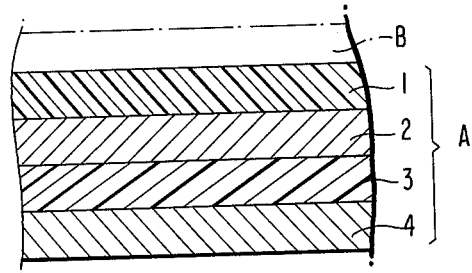
FIG. 1 is a vertical section of a support for a photographic printing paper according to the present invention.

FIG. 1 is a sectional view of a support A according to the present invention, in which 1 is a polyolefin synthetic resin layer and constitutes a surface layer of support A. This polyolefin synthetic resin layer 1 is generally made from low density (e.g., about 0.930 g/cm$^3$ or less) polyethylene in which white inorganic fillers such as titanium oxide (TiO$_2$) and the like are incorporated in order to prevent irregularity in reflection at the surface of the support A because when the surface of the support A is transparent, irregular reflection takes place, resulting in images which are not distinct. Titanium oxide with other pigments can also be used. The amount of the white inorganic filler incorporated into this polyolefin synthetic resin layer will vary depending on the adhesive property of the photographic layer B to be adhered to the polyolefin synthetic resin layer 1 or the thickness of the other layers of the support, but is usually more than about 1% by weight, preferably 10 to 25% by weight, based on the total weight of polyolefin resin layer 1.

The relative thickness of the polyolefin synthetic resin layer 1 is not more than about 20% of the total thickness of the support A so as to prevent an decrease in the stiffness of the support A and to increase resistance to curling. The resin layer 1 can be bonded to the other layers by extrusion laminating, dry laminating, etc. A suitable relative thickness for polyolefin synthetic resin layer 1 generally ranges from about 20% to about 5% of the total thickness and a suitable actual thickness for polyolefin resin layer ranges from about 60 to about 15 μ.

2 is an opaque layer, which is made of a synthetic paper or an opaque synthetic resin film in order to further increase the white opaqueness provided on the surface of the support A by the above polyolefin synthetic resin layer 1 and to provide water resistance, chemical resistance, stiffness and smoothness. Suitable synthetic resins which can be employed for the layer (b) include stretched or unstretched films, for example, of polyolefins, polyvinyl chloride, polyesters, polyvinylidene chloride, etc. These synthetic resin films can be rendered opaque by addition of inorganic fillers or organic pigments thereto, coating inorganic materials on the synthetic resin film surface, stretching a synthetic resin film containing inorganic fillers therein to form interstices around the filler particles, treating the film surface with a good solvent for the synthetic resin of the film, physically roughening the film surface etc. Suitable examples of synthetic papers which can be used as layer 2 are papers produced by the method disclosed in U.S. Pat. No. 3,799,828 wherein a laminated polypropylene film having a surface layer of polypropylene mixed with a filler is stretched to form a paper. A suitable relative thickness for opaque layer 2 generally ranges from about 70% to about 30% of the total thickness and a suitable actual thickness for opaque layer 2 ranges from about 135 to about 30 $\mu$.

3 is a synthetic resin layer made of a synthetic resin having a greater stiffness than the polyolefin resin layer 1, which is formed in such a manner that the relative thickness of the resin layer 3 is not less than about 15% of the total thickness of the support A. A relative thickness of less than about 15% provides insufficient stiffness to the support A and insufficient resistance to curling, and furthermore the workability is poor. A suitable relative thickness for synthetic resin layer 3 ranges from about 50% to about 15% of the total thickness and a suitable actual thickness for synthetic resin layer 3 ranges from about 70 $\mu$ to about 15 $\mu$.

The synthetic resin layer 3 may be a layer of any synthetic resin provided the synthetic resin has a greater stiffness than the polyolefin synthetic resin layer 1. In general, since the synthetic resin layer 1 is made of low density polyethylene, then high density (e.g., more than about 0.930 g/cm$^3$) polyethylene, polypropylene, polystyrene, a polyester and the like can be used as materials having greater stiffness than the low density polyethylene. Copolymers of polyethylene and polypropylene having a density of more than about 0.930 g/cm$^3$ can also be used. The use of the synthetic resin layer 3 having a greater stiffness than the polyolefin synthetic resin layer 1 makes it possible to prevent the photographic layer B coated on the support from curling the support A due to contraction at low humidities. Synthetic resin layer 3 may be transparent or opaque, as desired. The stiffness of the synthetic resin films will vary depending upon the type of film, the presence of stretching and the prior heat history of the film and cannot be unequivocally set forth. The following comparisons will provide an indication as to stiffness relationships which are suitable for synthetic resin layer 3 with respect to low-density polyethylene as polyolefin resin layer 1.

| | |
|---|---|
| Polyethylene (density: 0.930 g/cm$^3$ or less) | 100 |
| Polyethylene (density: 0.94 – 0.96 g/cm$^3$) | 300 – 500 |
| Polypropylene | 400 – 600 |
| Polyvinyl chloride | 500 – 750 |
| Polyvinylidene chloride | 500 – 1000 |
| Polyester | 1500 – 1800 |
| Polystyrene | 350 – 600 |

4 is a back surface layer, which generally should have properties such that it can be written on or printed on, non-water absorption properties, water resistance, chemical resistance, etc. It is desirable for this layer to be stiff, and to be made of a synthetic paper or a synthetic resin film on which writing is possible. A suitable relative thickness for back layer 4 ranges from about 70% to about 30% of the total thickness and a suitable actual thickness for back layer 4 ranges from about 135 $\mu$ to about 30 $\mu$. This back surface layer 4 combined with the opaque layer 2 with the synthetic resin layer 3 having greater stiffness therebetween is useful for preventing curling of the laminate. A suitable back surface layer 4 is a synthetic paper produced by laminating mono-axially stretched polypropylene film containing a large amount of an inorganic filler(s) on both surfaces of a bi-axially stretched polypropylene film, e.g., as disclosed in detail, in U.S. Pat. No. 3,799,828 and commercially available examples thereof include Kimdura (tradename, produced by Kimberly Clark Co.). Back surface layer 4 is opaque so that when written upon the writing can be seen. However, this layer does not need to be opaque throughout the layer.

With respect to the synthetic resins used in layers 1 to 4 above, the molecular weight thereof is not critical and can vary widely. As long as the synthetic resin has a sufficient molecular weight to be a film forming resin, such is suitable. Conventional lamination techniques can be employed to produce the laminate of the four layers described above and specific examples thereof are set forth in the examples given hereinafter.

In coating the photographic layer e.g., a light-sensitive photographic emulsion for a printing paper, B on one side of the support A laminated as described above, i.e., the surface of the polyolefin synthetic resin layer 1, a surface treatment, e.g., a high voltage discharge treatment, a flame treatment, treatment with dichromic acid, etc. is applied to the coating surface immediately before the coating of the photographic lyaer B.

Hitherto, when natural paper is used as a photographic printing paper support, a baryta layer has been interposed between the photographic layer and the support to obtain sufficient bonding strength between the layers. However, when the polyolefin surface is subjected to a discharge treatment as in the present invention, sufficient bonding strength between the polyolefin surface and the photographic layer is unexpectedly obtained and such is retained through development and fixation. Thus, in the present invention, a baryta layer can be omitted.

Increasing the amount of discharge enables the bonding strength between the photographic layer B and the support A to be increased when a discharge treatment is used.

Hereinafter the present invention is explained in greater detail by reference to the following examples. Unless otherwise indicated all parts, percents, ratios and the like are by weight.

EXAMPLE 1

A polyolefin synthetic resin layer 1 of Yukalon LK-30 (tradename for a low density polyethylene produced by Mitsubishi Petrochemical Co., Ltd.;MI (melt index):4 ;0.918 g/cm$^3$) with titanium oxide (TiO$_2$) incorporated therein in a thickness of 40 $\mu$ was extrusion-laminated on an opaque layer 2 of Yupo (tradename for a synthetic paper produced by Oji Yuka Synthetic Paper Co., Ltd.) having a thickness of 70 $\mu$. This laminated product and a back surface layer 4 of the above synthetic paper, Yupo, having a thickness of 75 $\mu$ were extrusion-bonded together with Mitsubishi Noblen FL-25B (tradename for a polypropylene produced by Mitsibishi Petrochemical Co., Ltd.; MI:10) having a thickness of 65 $\mu$ as a synthetic resin layer 3.

EXAMPLE 2

The same materials as described in Example 1 were laminated using the same method as used in Example 1, in which the thicknesses of the polyolefin synthetic resin layer 1, opaque layer 2, synthetic resin layer 3 and back surface layer 4 were respectively 55 $\mu$, 70 $\mu$, 50 $\mu$ and 75 $\mu$.

EXAMPLE 3

The same materials as described in Example 1 were laminated using the same method as used in Example 1, in which the thicknesses of the polyolefin synthetic resin layer 1, opaque layer 2, synthetic resin layer 3 and back surface layer 4 were respectively 70 $\mu$, 70 $\mu$, 35 $\mu$ and 75 $\mu$.

The physical properties of the supports produced in Examples 1 to 3 are shown in Table 1 below, in which the "Commercially Available Products" designates a support comprising a transparent high density polyethylene on one side of a natural paper and a white low density polyethylene containing $TiO_2$ on the other side. With regard to the methods of measurement, curling was measured by the Oji Yuka method and Taber stiffness was measured by JIS P8125.

To evaluate the properties of the laminates thus produced in each of the above examples, a conventional photographic layer was coated on the polyolefin synthetic resin layer 1 in a dry thickness of about 6 to 7 $\mu$ wherein the polyolefin synthetic resin layer 1 was surface-treated with a corona discharge before coating the photographic layer.

Table 1

| | Supports | | | |
|---|---|---|---|---|
| | Example 1 | Example 2 | Example 3 | Commercially Available Product |
| Thickness ($\mu$) | 250 | 250 | 250 | 250 |
| Specific Gravity | 0.98 | 0.99 | 1.00 | 1.03 |
| Curl 1/r (m) | −15 | −15 | −15 | −10 |
| Taber Stiffness (g.m) | | | | |
| Length | 13 | 11 | 10 | 19 |
| Width | 19 | 17 | 15 | 11 |
| Occurrence of Edge Staining | No | No | No | Yes |
| Writing Properties on Back Surface | Good | Good | Good | Bad |

The use of high density polyethylene, polypropylene, etc., having a high stiffness as the synthetic resin layer 3 in the present invention eliminates the defects of a synthetic paper that the firmness is low and the shape retention is poor, and thus a printing paper prepared by coating a photographic layer B on the support so produced is free from bending due to moisture absorption and drying of the photographic layer B.

Since the surface on which the photographic layer B is to be provided, is made of a polyolefin synthetic resin, the bonding strength between the photographic layer B and the polyolefin synthetic resin layer is high and deterioration preventing agents, antistatic agents and the like can not permeate through the photographic layer B with the lapse of time whereby discoloration of the light-sensitive layer is prevented.

Since the support of the present invention employs a synthetic paper having a smaller specific gravity than natural paper, the total weight of the support is small, which is convenient for shipment and other operations. The synthetic paper has good smoothness as compared with natural paper and thus the low density polyethylene with titanium oxide, etc., incorporated therein and laminated on the synthetic paper has also good smoothness. Furthermore even when a photographic layer is coated thereon, the good smoothness is not deteriorated. Further, even after development, the good smoothness is maintained and good luster and appearance can be obtained. The synthetic paper herein designates those films and sheets which are made of plastics and are processed so that it is possible to write thereon. Typical examples thereof include fiber synthetic paper obtained by processing a synthetic pulp and film synthetic paper obtained by processing a synthetic resin film [e.g., as described in Japanese Patent Publication No. 40794/71 (corresponding to U.S. Pat. No. 3,799,828)].

Where a conventional printing paper, in which a natural paper is used as a base, is subjected to development processing, a problem occurs in that the developer, stopping solution, fixing solution, etc., permeate into the printing paper through the edge thereof, i.e., a cut end, which cannot be removed sufficiently even by water washing, and as a result the edge tends to become discolored after drying. On the other hand, in the present invention, all of the layers of the support are synthetic resin materials and permeation of solutions into the edges and edge staining do not occur. Thus, rapid development and printing operations are possible on account of the non-water absorption properties thereof.

Furthermore, a printing paper produced from the support of the present invention has excellent ability to be written and printed on water resistance, chemical resistance and drying properties because the back surface layer of the support is made of a synthetic paper or a synthetic resin film on which writing is possible. In addition, the use of Yupo, a tradename for a synthetic paper produced by Oji Yuka Synthetic Paper Co., Ltd., as shown in the Examples hereinbefore has the advantage in that smoke and toxic gases are not generated and the heat generated when burned is small.

The support of the present invention can be produced by the use of a synthetic resin layer having a sufficiently high stiffness so that even though the photographic layer coated thereon expands or contracts due to moisture absorption, drying or variations in temperature, the support does not bend and its even shape is maintained. However, it is also possible for the support to be previously bent in a direction opposite to that on which the support bends so that when the photographic layer coated on the support expands or contracts, the support also bends, resulting in the evenness of the printing paper being maintained.

Figure 2:
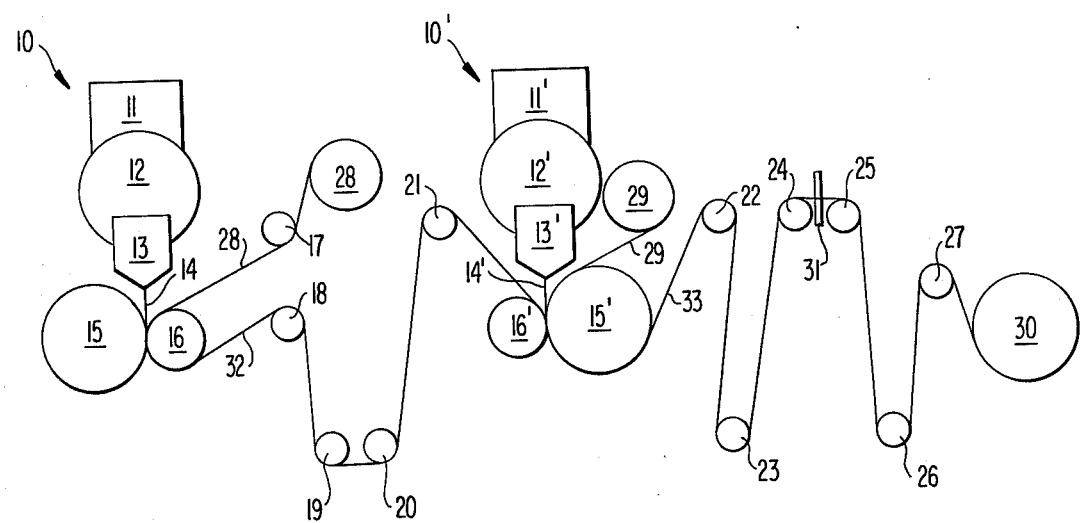
FIG. 2 is an illustrative figure of an apparatus for producing the support for a photographic printing paper according to the present invention.

In general, the printing paper bends toward the side on which a photographic layer is coated due to contraction of the photographic layer. It is, therefor, desirable for the support itself to be previously shaped in a convex form. A method for laminating the layers in a convex form will be explained by reference to an apparatus shown in FIG. 2.

A low density polyethylene containing titanium oxide ($TiO_2$), etc., is charged to a hopper 11 of an extrusion apparatus 10, melt-kneaded in an extruder 12 and extruded through a die 13 in such a manner that the temperature of the molten low density polyethylene (40 $\mu$ thick) is 320° C.

On the other hand, s synthetic paper, for example, Yupo produced by Oji Yuka Synthetic Paper Co., Ltd., (70 μ thick) 28 is introduced between a cooling roll 15 and a pressure roll 16 via a guide roll 17, and the molten low density polyethylene 14 is pressure-bonded to one side of the synthetic paper 28 between the rolls 15 and 16.

The surface of the synthetic paper, 28 on which the molten low density polyethylene 14 is coated, may be subjected to a surface treatment (e.g., a discharge treatment, an acid treatment, a flame treatment and the like) or an anchor treatment (e.g., a coating of polyethyleneimine, isocyanate, and the like), which are usually conducted in the field of lamination.

The laminated product 32 of the synthetic paper 28 and the molten low density polyethylene 14 is introduced between a cooling roll 15' and a pressure roll 16' via guide rolls 18, 19, 20 and 21, and another synthetic paper, 29 (75 μ thick) is also introduced between the rolls 15' and 16'.

On the other hand, polypropylene, e.g., Mitsubishi Noblen FL-25B produced by Mitsubishi Petrochemical Co., Ltd., 14' is charged to a hopper 11' of an extrusion apparatus 10', meltkneaded in an extruder 12' and extruded through a die 13' in such a manner that the temperature of the molten polypropylene 14' is 260° C.

The molten polypropylene 14' so extruded is introduced between the side of the laminated product 32 on which the molten low density polyethylene 14 is not coated, and the synthetic paper 29, and the laminated product 32 and the synthetic paper 29 are pressure-bonded between the cooling roll 15' and the pressure roll 16' whereby a laminated product 33 is obtained.

This laminated product 33 is transferred via guide rolls 22, 23 and 24, and trimmed in a slitter 31, and then transferred via guide rolls 26 and 27 and wound around a winding roll 30.

Suitable methods of shaping the low density polyethylene 14 in a convex form include a method in which the winding tension of the synthetic paper 29 is made greater than that of the laminated product 32; a method in which the surface temperature of the pressure roll 16' is made higher than that of the cooling roll 15'; a method in which the winding of the winding roll 30 is carried out in such a manner that the surface of the low density polyethylene is toward the outside of the roll; a method in which after winding with the winding roll 30, the product is allowed to stand at high temperatures (e.g., 40° to 80° C) for a long period of time (24 to 48 hours); etc. These methods may be effected individually or in combination with each other. The degree of bending is usually in a range of about −10 to −20 as curl 1/r (m).

As described above in detail, in accordance with the present invention, the disadvantages of a synthetic paper are removed and it is possible to obtain a support for photographic printing paper having excellent characteristics.

While the invention has been described in detail and with reference to specific embodiments thereof, it will be apparent to one skilled in the art that various changes and modifications can be made therein without departing from the spirit and scope thereof.

What is claimed is:

1. A support for a photographic printing paper comprising
    a. a polyolefin synthetic resin layer containing a white inorganic filler;
    b. an opaque layer of a synthetic paper or a synthetic resin film;
    c. a synthetic resin layer having a greater stiffness than the polyolefin synthetic resin layer (a); and
    d. a layer of a synthetic paper or a synthetic resin film on which writing is possible; in this order, wherein the relative thickness of the polyolefin synthetic resin layer (a) is about 20% or less of the total thickness of the support and the relative thickness of the synthetic resin layer (c) having a greater stiffness than the polyolefin synthetic resin layer (a) is about 15% or higher of the total thickness of the support.

2. The support for photographic printing paper according to claim 1, wherein the white inorganic filler is titanium oxide.

3. The support for photographic printing paper according to claim 1, wherein the polyolefin synthetic resin layer (a) is a layer of low density polyethylene.

4. The support for photographic printing paper according to claim 1, wherein the synthetic resin layer (c) having a greater stiffness than the polyolefin synthetic resin layer (a) is a layer of a material selected from the group consisting of high density polyethylene, polypropylene, polystyrene, or a polyester.

5. The support for photographic printing paper according to claim 1, wherein the support has a convex form.

* * * * *